Nov. 5, 1968

E. H. DAVIES 3,409,898

MULTI-POINT RECORDER

Filed June 19, 1967

INVENTOR.
EVERETT H. DAVIES

BY Wolfe, Hubbard, Voit & Osann
ATTORNEYS

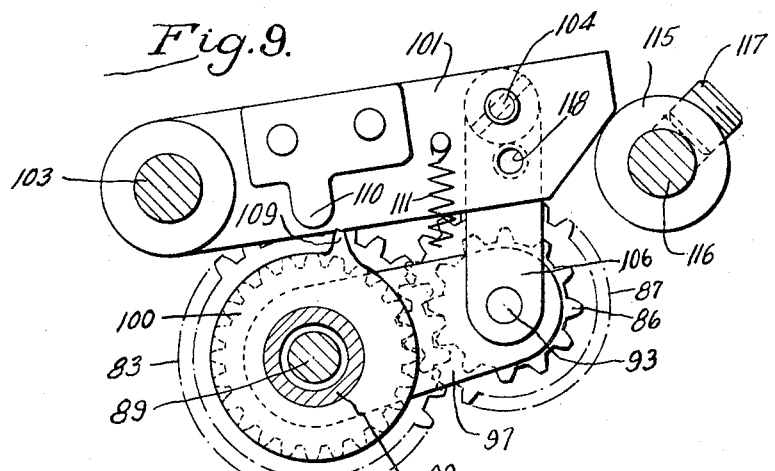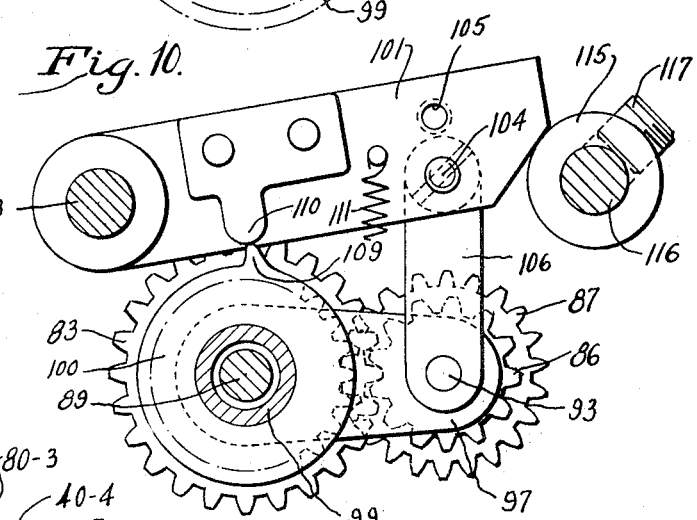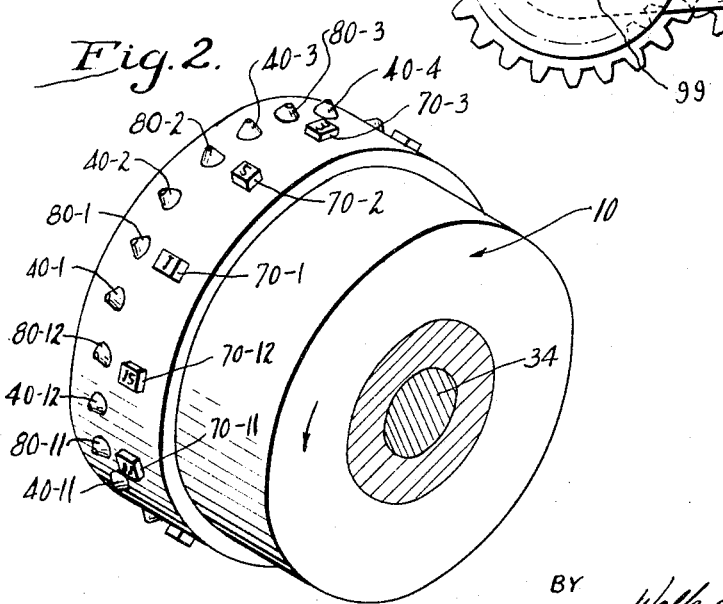

Nov. 5, 1968   E. H. DAVIES   3,409,898
MULTI-POINT RECORDER
Filed June 19, 1967   3 Sheets-Sheet 3
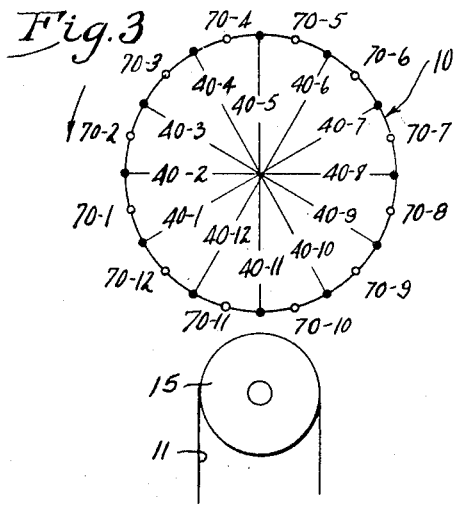
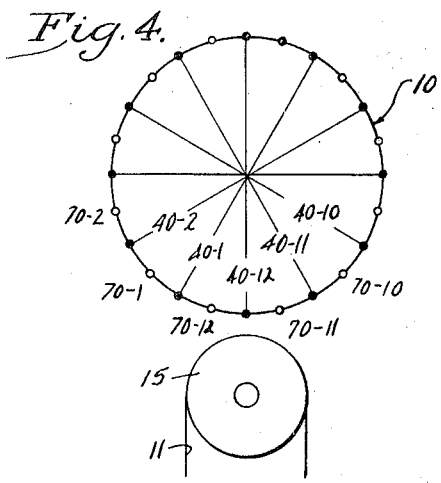
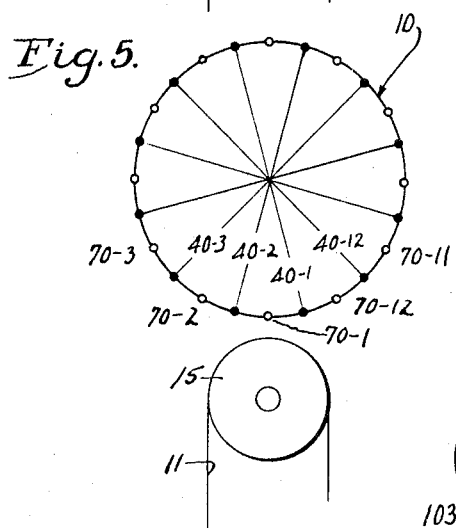
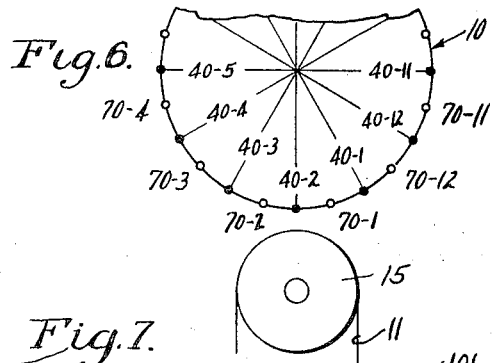
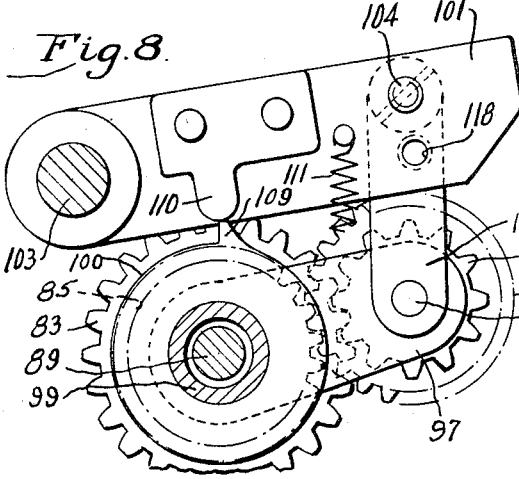
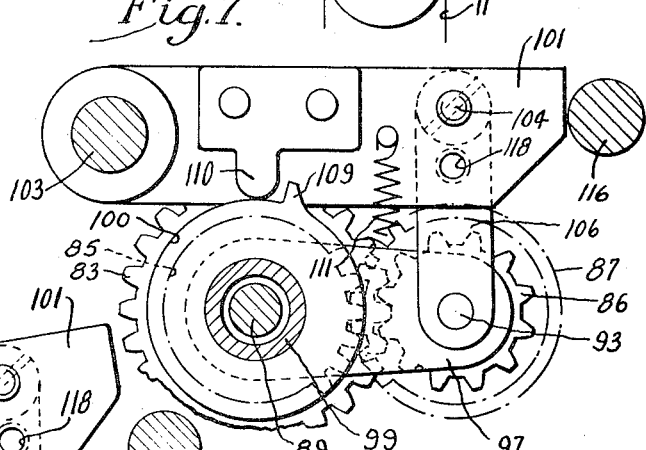
INVENTOR.
EVERETT H. DAVIES
BY
Wolfe, Hubbard, Voit & Osann
ATTORNEYS United States Patent Office 3,409,898
Patented Nov. 5, 1968

3,409,898
MULTI-POINT RECORDER
Everett H. Davies, Rockford, Ill., assignor to Barber-Colman Company, Rockford, Ill., a corporation of Illinois
Filed June 19, 1967, Ser. No. 646,997
11 Claims. (Cl. 346—61)

ABSTRACT OF THE DISCLOSURE

A multi-point recorder having a print wheel which is rotated intermittently through a series of equally spaced steps by a drive mechanism and which is moved into and out of printing contact with a recording chart between successive steps to print a series of dots indicating the values of a number of measured variables. At periodic intervals, differential gearing overrides the drive mechanism and causes the print wheel to index through one and one-half steps and print not only a dot but also a numeral enabling visual identification of the dots representing a given variable.

Background of the invention

This invention relates to a multi-point recorder of the type having a rotatable print wheel which moves across a recording chart and into and out of printing contact with the chart to print a series of visual dots or other suitable marks indicative of the changing magnitude of a number of measured variables sensed by a plurality of detecting instruments. More particularly, the invention has reference to a recorder in which the print wheel is indexed about its own axis after printing each dot and, after printing a series of dots for each variable is shifted from its normal printing sequence to print a distinctive point-identification character such as a letter or number so as to enable visual determination as to which variable is represented by a given series of dots. A recorder of the same general type is disclosed in Patent No. 3,195,141.

Summary of the invention

The primary aim of the present invention is to simplify the movement undertaken by the print wheel during shifting between a condition printing dots and a condition printing point-identification characters and, at the same time, to shift the wheel into and out of printing contact with the chart with the same motion regardless of whether the wheel is printing dots or characters. In a more detailed aspect, the invention contemplates a recorder in which the print wheel not only is indexed about its own axis between successive printings of dots but also is indexed about the same axis in a novel manner to print a different point-identification character after printing each series of dots so that sequential printing of dots and identification characters may be achieved while maintaining a constant angular relationship between the recording chart and the axis of the print wheel.

The invention also resides in the novel arrangement of printing markers about the periphery of the print wheel to enable the printing of both dots and characters while simply indexing the wheel about its axis.

Brief description of the drawings

FIG. 2 is an enlarged perspective view of the print wheel.

FIGS. 3 to 6 are diagrammatic views of the print wheel and illustrating the motions undertaken by the wheel in printing dots and point-identification characters.

FIG. 7 is an enlarged fragmentary elevation of a portion of a drive mechanism for indexing the print wheel, parts of the mechanism being broken away and shown in section.

FIG. 8 is a view similar to FIG. 7 and showing parts of the drive mechanism in moved positions.

FIG. 9 is a view similar to FIG. 7 and showing the drive mechanism conditioned to cause continuous printing of point-identification characters.

FIG. 10 is a view similar to FIG. 7 and showing the drive mechanism conditioned to cause printing dots only without any point-identification characters.

Description of the preferred embodiment

Figure 1:
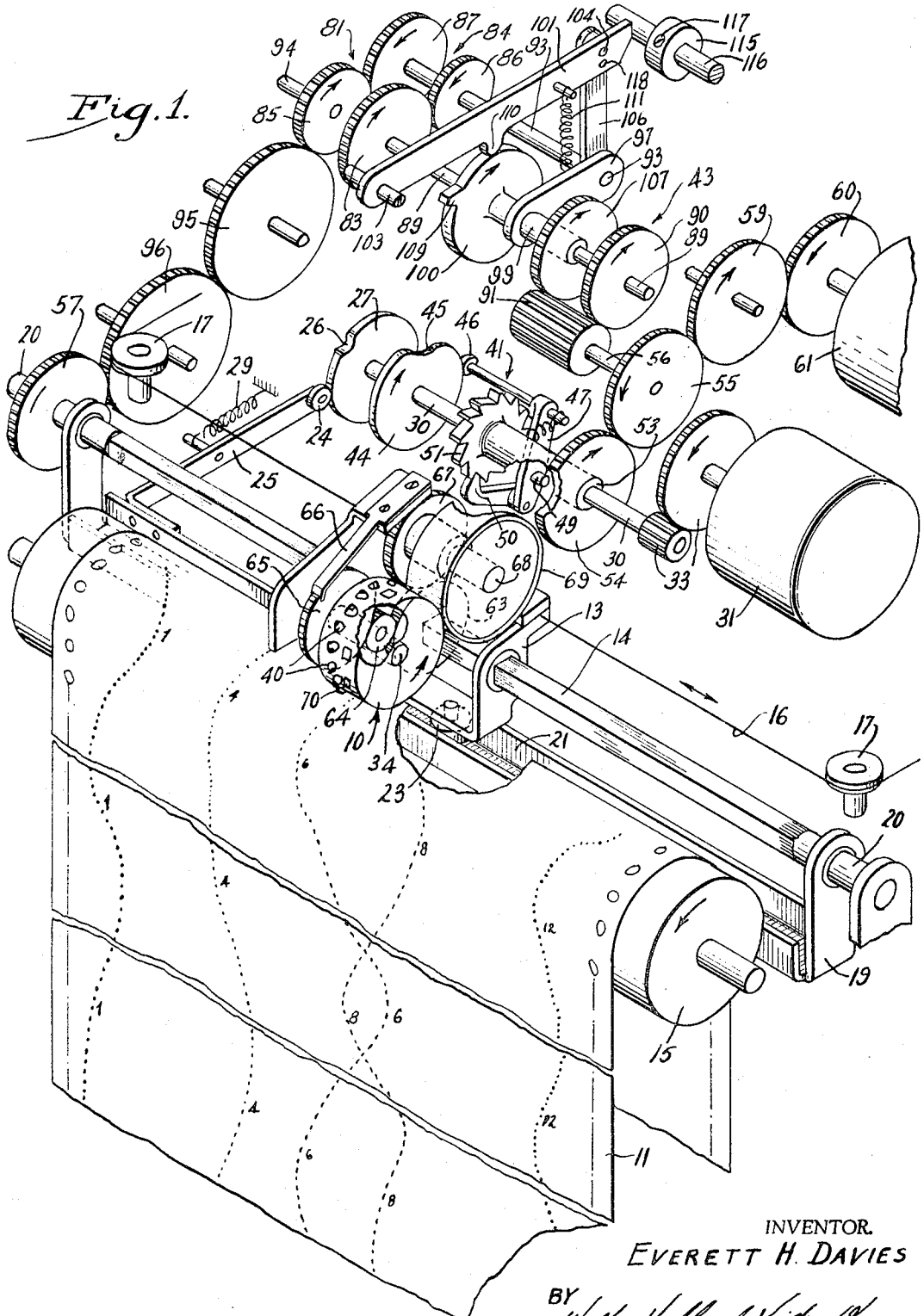
FIGURE 1 is a perspective view schematically illustrating a new and improved multi-point recorder embodying the features of the present invention.

As shown in the drawings for purposes of illustration, the invention is embodied in a multi-point recorder having a print wheel 10 which is moved transversely across a slowly moving recording chart 11 to a position corresponding with the magnitude of a measured variable sensed by one of a number of condition detecting instruments (not shown), is shifted momentarily into printing contact with the chart to print a visual mark or dot indicative of the magnitude of the measured variable relative to a function such as time, and then is moved to another position across the chart to print a dot indicating the value of a different variable sensed by a different one of the detecting instruments. Herein, the recorder is adapted to receive and record the readings from twelve of such instruments, and thus the wheel is shifted across the chart to twelve different transverse positions and prints twelve dots before repeating the cycle and printing another dot for each of the variables.

To shift the print wheel 10 to various transverse positions across the chart 11, a carriage 13 supporting the wheel is mounted slidably on a square shaft 14 extending parallel to an upper chart roller 15, and is moved in opposite directions along the shaft by a cable 16 connected to the carriage and trained around guide pulleys 17. The cable is driven by a reversible balancing motor (not shown) which is energized intermittently in response to signals sequentially received from successive detecting instruments thereby to shift the carriage and the print wheel across the chart to a position corresponding to the magnitude of the variable being measured by the particular instrument signaling the balancing motor. Between each shift, the carriage dwells in its transverse position momentarily and is rocked about the shaft to tilt the wheel into and out of printing contact with the chart. For this purpose, a yoke 19 is pivoted at opposite ends on rounded end portions 20 of the shaft and is formed with an upwardly opening channel 21 extending beneath the carriage and receiving a small guide wheel 23 journaled on the lower side of the carriage to turn about a vertical axis. As a follower 24 journaled on one end of an arm 25 fastened to the channel rides into a notch 26 formed in a rotating cam 27, a spring 29 connected to the arm rocks the channel rearwardly about the shaft thereby to swing the carriage and the print wheel downwardly to print a dot on the chart. The carriage and print wheel are raised away from the chart when the channel is rocked forwardly as the follower rides out of the notch. The cam is fast on one end of an elongated shaft 30 and is rotated by a synchronous motor 31 connected to the other end of the shaft by gearing 33.

In this instance, the print wheel 10 is mounted for rotation on the carriage 13 by a shaft 34 and is formed with a set of twelve dot markers 40–1 to 40–12 (FIG. 2) equally and angularly spaced around the periphery of the wheel and operable to print the dots when the wheel is lowered. During each transverse shift of the carriage while the wheel is out of contact with the chart 11, the wheel is indexed about the axis of the shaft 34 through a 30 degree arc which is equal to the angular spacing between adjacent markers 40. As a result, different markers are indexed successively into printing position directly above the chart and tangent to the chart roller 15 in timed relation with the transverse shifting of the carriage across the chart so that a given marker prints all of the dots for the measurements received from a particular one of the detecting instruments. That is, marker 40–1 prints a dot when the carriage is positioned in accordance with the measurement received from the first instrument, marker 40–2 prints a dot when the carriage is positioned in accordance with the measurement received from the second instrument, and so on until the position of the carriage once again corresponds to the measurement received from the first instrument and marker 40–1 again is indexed into printing position to print a dot indicative of the value of the latter measurement.

To index the print wheel 10, the motor 31 acts through a ratchet mechanism 41 and a drive mechanism 43 to rotate the square shaft 14 step-by-step about its axis, the intermittent motion of the shaft 14 being transmitted to the wheel to index the latter. More specifically, the ratchet mechanism comprises a cam 44 fast on the motor-driven shaft 30 and formed with a notch 45 angularly spaced from the notch 26 in the cam 27. Each time a follower 46 on one end of a lever 47 rides into the notch 45, the lever is rocked about a pivot 49 and causes a pawl 50 on the other end of the lever to engage one of the teeth of a twelve tooth ratchet 51 and to index the ratchet clockwise through one step. The ratchet is keyed to one end of a hub 53 telescoped over and rotatable on the shaft 30. Fast on the other end of the hub is a gear 54 meshing with a one-to-one ratio with a gear 55 on a shaft 56 which constitutes the input shaft of the drive mechanism 43. As the pawl indexes the ratchet to turn the hub 53 and the gear 54, the gear 55 and the input shaft 56 are rotated intermittently through an angle equal to the angular displacement of the ratchet. From the input shaft 56, the intermittent motion is transmitted through the drive mechanism 43 to a gear 57 keyed to one end of the square shaft 14 to index the latter shaft and the print wheel. In addition, the input shaft 56 acts directly through gears 59 and 60 to rotate a selector switch 61 which connects successive detecting instruments with the balancing motor that shifts the carriage 13 transversely. Such transverse shifting therefore is synchronized with the indexing of the wheel.

As the square shaft 14 is indexed, a gear 63 slidable along the square shaft with the carriage 13 is rotated and acts through an idler gear 64 to index the print wheel 10 by means of a gear 65 fast on the shaft 34 mounting the print wheel. A pawl 66 in the form of a spring arm is fastened to the carriage and engages the teeth of the gear 65 to lock the printing markers 40 in printing position while the wheel is dwelling between steps. The gear 63 also meshes with a gear 67 fastened to a shaft 68 journaled in the carriage so as to rotate an inking wheel 69 keyed to the shaft 68 and disposed rearwardly of the print wheel. Each printing marker is pressed against the inking wheel and is inked before being indexed into printing position.

To enable easy visual determination as to which variable is represented by a given series or line of dots, the print wheel 10 is shifted periodically to print a distinctive point-identification character alongside each line of dots after a predetermined number of dots have been printed in the line. Preferably, the point-identification characters are numerals which are numbered consecutively from one to twelve and which are printed by a set of point-identification markers 70–1 to 70–12 (see FIG. 2).

In accordance with the present invention, the point-identification markers 70 are arranged in a novel manner on the print wheel 10, and the wheel is merely indexed about its own axis to shift the point-identification markers periodically into printing position thereby to simplify the motion undertaken by the wheel in shifting from dot printing to point-identification printing and to maintain a constant angular relationship between the axis of the wheel and the chart 11. To these ends, the point-identification markers 70 alternate angularly with the dot markers 40 around the periphery of the print wheel and are shifted into printing position when the wheel is indexed through a step different than the normal steps through which the wheel is indexed while printing dots. The drive mechanism 43 indexes the print wheel through a series of equally spaced steps to present successive dot markers 40 into printing position and is overridden at periodic intervals to index the wheel through a different step and to present a point-identification marker 70 into printing position.

In the present instance, the point-identification markers 70 are equally spaced from each other around the periphery of the print wheel 10 and are offset transversely from the dot markers 40. The point-identification markers 70 are disposed mid-way between adjacent pairs of dot markers 40 and preferably are associated with additional dot markers 80–1 to 80–12 (FIG. 2) which are alined angularly with the respective point-identification markers 70 while being alined transversely with the primary dot markers 40. With this arrangement, one of the dot markers 80 prints a dot at the same time its associated point-identification marker 70 is printing a numeral so that the line of dots representing a given variable is not interrupted when an identifying numeral is printed.

Herein, each point-identification marker 70 is arranged on the wheel 10 in trailing relationship with respect to the primary dot marker 40 which prints the dots only for the same variable. That is, point-identification marker 70–1 advances through printing position after primary dot marker 40–1, point-identification marker 70–2 advances through printing position after primary dot marker 40–2, and so on throughout the cycle. In operation, the print wheel initially is indexed through a series of twenty-four normal steps each equal in angular distance to the distance between adjacent dot markers 40, and thus successive dot markers 40 are advanced into printing position to print dots only (see FIGS. 3 and 4). After two unidentified dots for each variable have been printed or after the printing of the twenty-fourth unidentified dot, the drive mechanism 43 is overridden and the wheel is indexed through one and one-half steps thereby to advance the point-identification marker 70–1 into printing position (see FIG. 5) instead of the dot marker 40–1. The wheel then is moved into and out of printing contact with the chart 11 to print the numeral "1" alongside the line of dots representing the first variable, a dot also being printed adjacent the numeral by the dot marker 80–1. Thereafter, the wheel is indexed through only one-half step to advance primary dot marker 40–2 into printing position (FIG. 6). Normal operation of the drive mechanism then resumes with the wheel being advanced through normal or full steps to present successive dot markers 40 once again into printing position. After printing twenty-four additional unidentified dots, the drive mechanism 43 again is overridden to index the wheel through one and one-half steps and, with this index, point-identification marker 70–2 is presented into printing position instead of point-identification marker 70–1 due to the fact that override occurs during every 25th index of the wheel instead of during every 24th index. Such sequential indexing of the wheel through full and fractional steps continues with a different point-identification numeral being printed on every 25th printing of the wheel until finally, on the 325th printing, the numeral "1" again is printed alongside its corresponding line of dots.

To achieve the foregoing, the drive mechanism 43 includes a differential 81 having two input elements 83 and 84 driven by the input shaft 56 and having an output element 85 driven in accordance with the resultant motion of the input elements and drivingly connected to the square shaft 14. Indexing of the print wheel 10 through full steps is achieved by driving the output element 85 directly by the input element 83 while the input element 84 is idle. At periodic intervals, the input element 84 is actuated and its motion first is added to an then is subtracted from the motion of the input element 83 to cause the wheel to index first through one and one-half steps and then through only one-half step thereby shifting a point-identification marker 70 into and out of printing position.

More specifically, the input element 83 and the output element 85 of the differential 81 herein are rotatably driven sun gears, and the input element 84 is a pair of planet gears 86 and 87 arranged epicyclic fashion with the sun gears to produce the desired sequential indexing of the print wheel 10. The input sun gear 83 is fastened to one end of a shaft 89 which is rotated through one revolution for each two revolutions of the input shaft 56 of the drive mechanism 43 by means of a twenty-four tooth gear 90 on the other end of the shaft 89 meshing with a twelve tooth long gear 91 on the input shaft 56. The sun gear 83 meshes with a one-to-two ratio with the planet gear 86 which is keyed to and turns a shaft 93. Fast on and rotatable with the shaft 93 is the other planet gear 87 which meshes with a one-to-one ratio with the output sun gear 85, the latter being keyed to a shaft 94. As the output gear 85 is rotated, its motion is transmitted to the gear 57 on the square shaft 14 by a pair of idler gears 95 and 96 meshing with each other and with the gears 85 and 57.

To print dots only, the twelve tooth gear 91 turns the twenty-four tooth gear 90 and the shaft 89 intermittently through one revolution each time the ratchet 51 is indexed through twenty-four steps. By means of the input sun gear 83 and the planet gear 86, the shaft 89 rotates the shaft 93 step-by-step in a counterclockwise direction through two revolutions during this time. This motion is transmitted with a one-to-one ratio to the gear 57 on the square shaft 14 through the planet gear 87, the output sun gear 85 and the idler gears 95 and 96. As a result, the square shaft 14 and the print wheel 10 are indexed through twenty-four full steps to present twenty-four successive dot markers 40 into printing position during the time the ratchet 51 is being indexed through twenty-four steps and during the time the shaft 89 is being rotated through one revolution.

As the ratchet 51 is indexed through its 25th step, the input planet gears 86 and 87 are actuated and their motion is added to the motion being transmitted to the output gear 85 by the input sun gear 83 thereby to index the wheel through one and one-half steps. For this purpose, the shaft 93 is journaled for rotation in the rear end of a lever arm 97 (see FIGS. 1, 7 and 8) which is pivoted at its forward end on a hub 99 journaled for rotation on the shaft 89. When the lever arm is swung upwardly or counterclockwise about the axis of the hub 99 and the shaft 89 from the position shown in FIG. 7 to that shown in FIG. 8, the planet gear 86 is turned counterclockwise about the axis of the shaft 93 through an arc proportional to the angular displacement of the print wheel 10 in indexing through one-half step. Such turning, together with the one-to-two ratio of the gears 83 and 86 causes counterclockwise rotation of the shaft 93 through an angle sufficient to index the print wheel through one-half step, this rotation being added to that being simultaneously imparted to the shaft 93 by the shaft 89 for indexing the wheel through one step. Accordingly, the shaft 93 indexes the wheel through one and one-half steps so that point-identification marker 70–1, for example, is advanced into printing position instead of dot marker 40–1 (see FIG. 5).

After the numeral "1" has been printed on the chart 11 and during the 26th step of the ratchet 51, the lever arm 97 and the shaft 93 are swung clockwise about the axis of the shaft 89 and the hub 99 to return the planet gears 86 and 87 to the lowered position shown in FIG. 7. As a result, the planet gear 86 in effect is turned reversely or clockwise about the axis of the shaft 93 and causes clockwise rotation of the shaft 93 through an angle proportional to one-half step thereby to subtract from the normal motion being transmitted to the shaft 93 from the shaft 89. The resultant motion of the shaft 93 is sufficient to index the wheel 10 through only one-half step, and thus dot marker 40–2 is indexed into printing position and the dot only printing cycle is restored. (See FIG. 6.)

To swing the lever arm 97 and the shaft 93 between their raised and lowered positions, timing mechanism in the form of a rotating cam 100 fast on one end of the hub 99 rocks a lever 101 upwardly and downwardly about a frame rod 103 to which the forward end of the lever is pivotally connected. A screw 104 (see FIGS. 7 to 10) extending through a hole 105 in the rear end of the lever 101 pivotally connects the latter to the upper end of a vertical link 106 whose lower end rotatably receives the shaft 93. The cam 100 is rotated by a twenty-five tooth gear 107 (FIG. 1) fast on the hub 99 and meshing with the twelve tooth long gear 91. Once during each revolution of the cam 100, a lobe 109 on the cam engages a follower 110 formed between the ends of the lever 101 to rock the lever upwardly or counterclockwise about the frame rod 103 and thus swing the shaft 93 and the planet gears 86 and 87 upwardly to the position shown in FIG. 8. Accordingly, the print wheel 10 is indexed through one and one-half steps to advance a point-identification marker 70 into printing position. After the lobe 109 has rotated from beneath the follower 110, a spring 111 (FIG. 1) connected to the lever 101 returns the lever, the shaft 93 and the planet gears 86 and 87 to their lowered positions (FIG. 7) to cause indexing of the print wheel through only one-half step and to restore the drive mechanism 43 to a condition in which the print wheel is indexed through full steps to print dots only.

Because of the particular ratios with which the twenty-five tooth gear 107 and the twenty-four tooth gear 90 mesh with the twelve tooth long gear 91, the cam 100 is rotated through an angle of 720 degrees for each 750 degrees of rotation of the shaft 89 and the input sun gear 83. With this phase relationship, the lobe 109 is positioned beneath the follower 110 during each 25th step of the input sun gear 83 to actuate the planet gears 86 and 87 and cause point-identification printing. Since the planet gears 86 and 87 are actuated during the 25th step of the sun gear 83, a different point-identification marker 70 is indexed into printing position and a different identification numeral is printed following the printing of every set of twenty-four dots until each of the numerals "1" to "12" has been printed. Of course, it should be realized that the invention is not limited to the specific gearing disclosed. With the same number of point-identification markers 70 (i.e., twelve), a different identification numeral can be printed after printing a set of only twenty-two dots simply by selecting gearing operable to actuate the planet gears 86 and 87 on the 23rd step of the input sun gear 83. Still, each of the point-identification markers 70 will print one time before the first point-identification marker prints a second time. If yet a different frequency of point-identification printing is desired or if a different number of point-identification markers 70 are used, similar results may be attained by changing the gears 90, 91 and 107 and/or by adding one or more lobes 109 to the cam 100. In general, the gearing should be designed to actuate the planet gears 86 and 87 at equal intervals corresponding to the time during which the print wheel 10 turns through an angle $\theta$ corresponding with $$\theta = M360° \pm \frac{360°}{N}$$

where $M=$ any integer, and
$N=$ the number of equally spaced point-identification markers 70.

In the specific embodiment disclosed, $M=2$ and $N=12$ and thus the planet gears 86 and 87 are actuated each time the print wheel rotates through an angle of 750 degrees.

In the present instance, provision is made to adapt the wheel 10 to print identification numerals continuously or to print dots only without any identification numerals. To print identification numerals continuously, the lever 101 and the planet gears 86 and 87 are raised manually to their elevated positions and are held in such positions by placing a collar 115 beneath the rear end of the lever (see FIG. 9). The collar is slidable on a frame rod 116 and may be anchored in a stationary position on the rod by a set screw 117. By thus raising the planet gears 86 and 87, the print wheel 10 is manually indexed through a half-step to shift a point-identification marker 70 into printing position. Then, as the wheel is indexed through full steps by the input sun gear 83, successive point-identification markers 70 are continuously presented into printing position instead of dot markers 40. The follower 110 is spaced above the lobe 109 and thus the cam 100 simply rotates with an idle motion so as not to disturb the position of the planet gears. If it is desired to print continuous lines of dots without any identification numerals, the collar 115 is slid beneath the lever 101 to disable the cam 100 as before. Thereafter, the planet gears 86 and 87 are lowered to their normal positions as shown in FIG. 10. This may be achieved by removing the screw 104 from the hole 105 and the upper end of the link 106, lowering the link, and then fastening the screw through a lower hole 118 in the rear end of the lever 101. With the planet gears 86 and 87 in their lowered positions and with the cam 100 disabled, the wheel 10 is indexed only through full steps and is conditioned to advance only dot markers 40 into printing position.

It will be observed from the foregoing that the print wheel 10 is simply indexed about its own axis in a novel manner not only to advance dot markers 40 into printing position but also to advance point-identification markers 70 into printing position at predetermined times. Thus, the wheel need not be shifted about any other axis to change between the two types of printing and, as a result, a constant angular relation is always maintained between the chart and the axis of the wheel so that the wheel can be moved into and out of printing contact with the chart with a simple vertical swinging motion.

I claim as my invention:

1. In a multi-point recorder having a recording chart, the combination of, a carriage movable back and forth across the chart, a print wheel mounted on said carriage for rotation about a predetermined axis, a first set of markers equally spaced around the periphery of said wheel, a second and distinctively different set of markers equally spaced around the periphery of said wheel and alternating angularly with said first markers, drive mechanism for intermittently rotating said wheel about said axis through a set of a predetermined number of equally spaced steps each correlated in angular distance with the spacing between said first markers thereby to present successive ones of the first markers into printing position relative to the chart, means operable when actuated to cause indexing of said print wheel about said axis through an angular distance correlated with the angular spacing between the markers of said first and second sets thereby to present a marker of said second set momentarily into printing position, timing mechanism responsive to said drive mechanism at equal intervals between each set of steps to actuate said means whereby a different marker of said second set of markers is presented into printing position between each set of steps, and an actuator operably connected to said print wheel for moving the latter into and out of printing contact with the chart when said markers are in printing position.

2. A multi-point recorder as defined in claim 1 in which said timing mechanism actuates said means at intervals equal to the time during which said print wheel turns through an angle $\theta$ corresponding with $$\theta = M360° \pm \frac{360°}{N}$$

where $M=$ any integer
$N=$ number of equally spaced markers in said second set.

3. In a multi-point recorder having a recording chart, the combination of, a carriage movable back and forth across the chart, a print wheel mounted on said carriage for rotation about a predetermined axis, a first set of markers equally spaced around the periphery of said wheel, a second and distinctively different set of markers equally spaced around the periphery of said wheel and alternating angularly with said first markers, drive mechanism for intermittently rotating said wheel about said axis through a series of a predetermined number of equally spaced steps each correlated in angular distance with the spacing between said first markers thereby to present successive ones of the first markers into printing position relative to said chart, means operable when actuated to override said drive mechanism and to index said wheel about said axis through an arc correlated with the angular spacing between the markers of said first and second sets and different than the angular spacing between the markers of said first set thereby to present a marker of said second set momentarily into printing position, timing mechanism for actuating said means, and an actuator connected to said print wheel for moving the latter into and out of printing contact with the chart when said markers are in printing position.

4. In a multi-point recorder having a recording chart, the combination of, a carriage movable back and forth across the chart, a print wheel mounted on said carriage for rotation about a predetermined axis, a set of dot markers equally spaced around the periphery of said wheel, a set of point-identification markers equally spaced around the periphery of said wheel and alternating angularly with said dot markers, drive mechanism for intermittently rotating said wheel about said axis through a series of equally spaced steps correlated in angular distance with the spacing between said dot markers thereby to present successive dot markers into printing position, means operable when actuated to index said wheel about said axis through an arc correlated with the angular spacing between said dot markers and said point-identification markers thereby to present a point-identification marker into printing position, timing mechanism for actuating said means at equal intervals and for controlling whether a dot marker or a point-identification marker is presented into printing position, and an actuator connected to said wheel for moving the latter into and out of printing contact with the chart when said markers are in printing position.

5. A multi-point recorder as defined in claim 4 in which said timing mechanism actuates said means at intervals equal to the time during which said print wheel turns through an angle $\theta$ corresponding with $$\theta = M360° \pm \frac{360°}{N}$$

where $M=$ any integer
$N=$ number of equally spaced point-identification markers.

6. A multi-point recorder as defined in claim 4 in which said point-identification markers are offset transversely of said wheel from said dot markers, and further including a second set of dot markers alined transversely with said one set of dot markers and alined angularly with said set of point-identification markers.

7. In a multi-point recorder having a recording chart, the combination of, a carriage movable back and forth across the chart, a print wheel mounted on said carriage for rotation about a predetermined axis, a first set of markers equally spaced around the periphery of said wheel, a second and distinctively different set of markers equally spaced around the periphery of said wheel and alternating angularly with said first markers, differential gearing having first and second input elements and having an output element driven in accordance with the resultant motion of said input elements and operably connected to said wheel for rotating the latter about said axis, drive mechanism intermittently driving said first input element and acting through said output element to rotate said wheel intermittently about said axis through a series of a predetermined number of equally spaced steps corresponding in angular distance with the spacing between said first markers thereby to advance successive ones of the first markers into printing position relative to the chart, means operable upon a first actuation to drive said second input element in one direction with the resultant motion of said input elements causing said output element to index said wheel about said axis through a first arc correlated with the angular spacing between the markers of said first and second sets and different than the angular spacing between the markers of said first set thereby to present a marker of said second set into printing position, said means being operable upon a subsequent second actuation to drive said second input element in the opposite direction with the resultant motion of said input elements causing said output element to index said wheel about said axis through a second arc, the combined arcuate length of said first and second arcs being equal to twice the spacing between said first markers, timing mechanism responsive to said drive mechanism and operable at first intervals to provide the first actuation to said means and operable at second intervals to provide the second actuation to said means, and an actuator connected to said print wheel for moving the latter into and out of printing contact with the chart when said markers are in printing position.

8. A multi-point recorder as defined in claim 7 in which said timing mechanism is operable to cause said first and second actuations of said means after the completion of the last step of one of said series and before the beginning of the first step of the next succeeding series.

9. A multi-point recorder as defined in claim 7 further including means for selectively disabling said second input element whereby only the markers of said first set are presented into printing position.

10. In a multi-point recorder having a recording chart, the combination of, a carriage movable back and forth across the chart, a print wheel mounted on said carriage for rotation about a predetermined axis, a first set of markers equally spaced around the periphery of said wheel, a second and distinctively different set equally spaced around the periphery of said wheel and alternating angularly with said first markers, a differential having first and second input elements and having an output element driven in accordance with the resultant motions of said input elements and operably connected to said wheel for rotating the latter about said axis, drive mechanism driving said first input element and acting through said output element to rotate said wheel intermittently about said axis through a series of a predetermined number of equally spaced steps correlated in angular distance with the spacing between said first markers thereby to advance successive ones of the first markers into printing position relative to the chart, means operable when actuated to drive said second input element in one direction and coacting with said first input element to cause said output element to index said wheel about said axis through a predetermined arc, said arc being equal in length to the angular distance between adjacent markers of said first set changed by the angular distance between adjacent markers of said first and second sets whereby a marker of said second set is presented periodically into printing position, timing mechanism responsive to said drive mechanism at equal intervals between each series of steps to actuate said means whereby a different marker of said second set is presented into printing position between each series of steps, and an actuator connected to said wheel for moving the latter into and out of printing contact with the chart when said markers are in printing position.

11. A multi-point recorder as defined in claim 10 in which said second input element moves to a predetermined position when actuated and independently indexes said wheel through an arc equal to the spacing between the markers of said first and second sets, and selectively operable means for holding said second input element in said predetermined position whereby only markers of said second set are presented into printing position when said first input element is driven.

References Cited

UNITED STATES PATENTS 3,195,141 7/1965 Brown et al. _____ 346—61
3,317,913 5/1967 Paschkis _____ 346—34

RICHARD B. WILKINSON, *Primary Examiner.*

J. W. HARTARY, *Assistant Examiner.*